United States Patent Office.

LOUIS ADOLPHE DE MILLY, OF PARIS, FRANCE.

Letters Patent No. 81,884, dated September 8, 1868.

IMPROVEMENT IN THE MANUFACTURE OF SOLID FATTY ACIDS.

*The Schedule referred to in these Letters Patent and making part of the same.*

TO ALL WHOM IT MAY CONCERN:

Be it known that I, LOUIS ADOLPHE DE MILLY, of Paris, France, manufacturer, have invented a new Mode of Producing Solid Fatty Acids; and I do hereby declare that the following is a full and sufficient description of the same.

The nature of the invention consists in a new mode of producing solid fatty acids by a certain treatment of crude tallow and palm-oil of commerce.

I generally operate on a mixture of tallow and palm-oil, and this mixture is to be made in such proportions that the fatty acids obtained have a crystalline fibrous texture, which allows the liquid portions to escape, on the application of pressure, when methodically and judiciously combined, which proportions may be one of tallow, and one or more palm-oil.

The proportions of the ingredients cannot be precisely stated, as they vary with the character of the fatty bodies operated on, and their greater or less tendency to assume the crystalline texture.

When the palm-oil is in a fair marketable condition, to carry out the operation, I proceed as follows:

The fats are melted, and heated to a temperature of from 244° Fahrenheit, to 248° Fahrenheit, in a cast-iron or leaden tank, by any convenient method of applying heat. It is then run, in a small stream, into a small lead basin, (say, ten by ten by four inches,) and into the same basin, a small stream of concentrated sulphuric acid is run at the same time, and in such manner that about six per cent. of acid mixes with the melted fats. The mixture then runs through a leaden tube, and may be mixed more intimately by passing through a paddle-churn. Although, this is not necessary, if the mixture is made to run through a sufficient length of lead pipe, the action between the acid and fats is allowed to last for two or three minutes, when it is arrested completely by running the mixture in a large receiver, full of boiling water, where the glycerine is separated entirely into solution, and the fatty acids float on the surface, very much colored; but, contrary to what takes place in the method now employed for saponifying by sulphuric acid, the fatty acids are colored by a matter completely soluble in the liquid-fat acids. It consequently happens that in pressing the mixed fatty acids, after they cool, the harder portion, (the candle-stuff,) is rendered perfectly white, and fit for moulding into candles. But it is, in most instances, preferable to remelt after the first pressure, cool in the pans, and subject the same to hot pressure, such as is now used in the manufacture of candles by the other processes of saponification.

The great and marked difference between the methods here proposed for saponifying by sulphuric acid and the method now in common use is, that in the latter case a good deal of tarry matter is produced, which gives rise to certain loss, and, moreover, renders a distillation of the fatty acids necessary, prior to subjecting it to the action of the press, while, in the former case, a complete saponification is accomplished, without the formation of tarry matter, and the fatty acids may be at one submitted to the action of the press; without distillation. After completing the operation of the pressing, the stearic acid, although beautiful and white, may be farther improved in brilliancy by mixing with water holding in solution a small amount of the white of eggs, as this albuminous matter tends to collect and separate any particle of coloring-matter that may remain in the fat acids.

Having described the nature of the invention, and the mode of using the same what I claim as my invention, and desire to secure by Letters Patent, is—

1. Complete saponification by means of sulphuric acid, in the space of three minutes or less, substantially as and for the purpose set forth.

2. Also, saponifying by means of sulphuric acid, without distillation of the fatty acids, and without the usual deposit of carbonaceous, insoluble, tarry matter, which accompanies the existing mode of using sulphuric acid, as described in the specification.

3. The use of water and white of egg for giving the brilliant whiteness to the candle-stuff, substantially in the manner and for the purpose set forth.

4. The due mixture of the palm and animal fat, substantially as described, for giving the crystalline structure found in this compound.

5. While I do not claim the use of pressure to separate liquid and solid fats treated with sulphuric acid, I do claim treating this material with the succession of hot and cold pressure, substantially in the manner and for the purpose described.

ADOLPHE DE MILLY.

Witnesses:
JAMES HAND,
DAVID T. S. FULLER.